June 10, 1941.  H. J. HERSEY, JR  2,245,037
COUPLING FOR FLEXIBLE PIPES
Filed Feb. 2, 1938
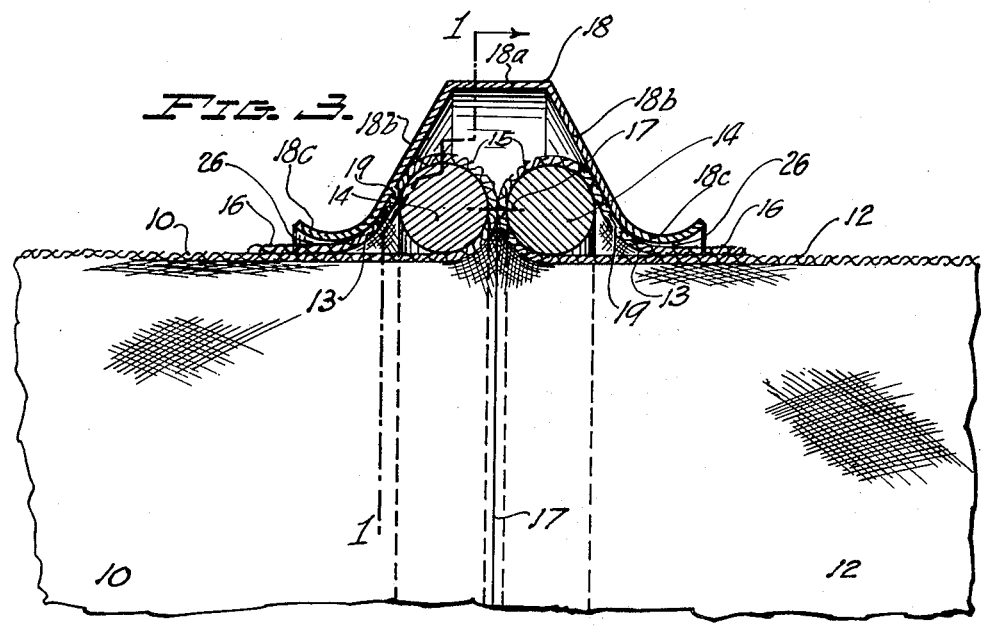
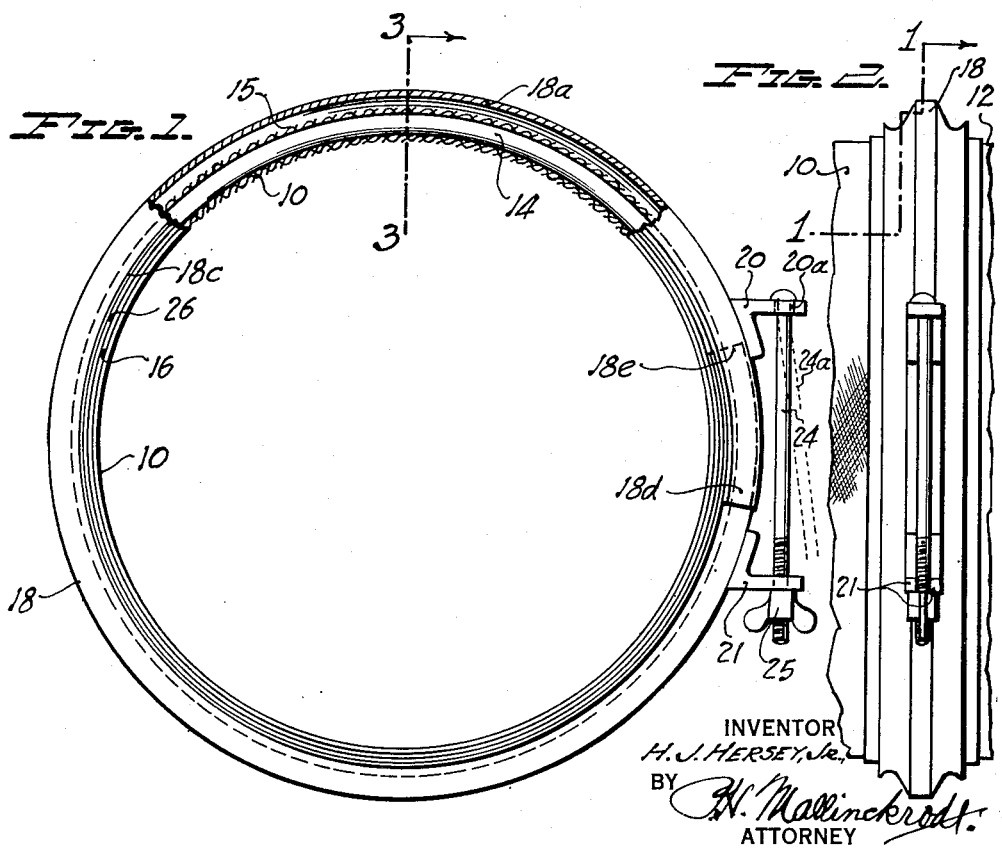
INVENTOR
H. J. HERSEY, Jr.,
BY
ATTORNEY Patented June 10, 1941

2,245,037

UNITED STATES PATENT OFFICE 2,245,037

COUPLING FOR FLEXIBLE PIPES

Henry J. Hersey, Jr., Seattle, Wash.

Application February 2, 1938, Serial No. 188,246

1 Claim. (Cl. 285—71)

This invention relates to a coupling for flexible pipes, and more particularly, a coupling for flexible pipes such as are largely used in mine ventilation. Among the principal objects are, to provide:

First.—A coupling which is substantially fluid-tight to a maximum degree under all normal conditions.

Second.—A demountable coupling which is located outside the pipe, and which is easily and quickly applied or installed.

Third.—A coupling which may be used over and over again without injury either to its component parts or to the flexible pipes.

Fourth.—A coupling which is narrower and lighter than any of which I have heretofore been aware, therefore being more advantageous in handling and shipping.

Fifth.—A coupling which is efficient and durable even under hard usage, and comparatively inexpensive.

Sixth.—A coupling which requires no sewing of the flexible pipe.

In the drawing, which illustrates one embodiment of the invention:

Fig. 1 represents an end elevation partially in section, taken on the lines 1—1 in Figs. 2 and 3;

Fig. 2, a side elevation; and,

Fig. 3, a cross-section taken through the coupling on the line 3—3 in Fig. 1, drawn to an enlarged scale, and showing fragmentary portions of two coupled pipes.

Flexible pipe is extensively used for ventilation, particularly in mining operations, and is usually made of canvas or other suitably woven fabric. In mining operations, ventilating systems are subject to frequent changes in location. Accordingly, as the operations progress, certain portions of the ventilating system may be extended and others abandoned. As a consequence, couplings are continually being connected and again disconnected. Therefore, in addition to being suitable for permanent installations, a satisfactory coupling for flexible pipes must be capable of being used over and over again without injury, either to its component parts or to the fabric of the pipes to which the coupling is applied.

Referring to the drawing, the numeral 10 denotes an end portion of one length of flexible pipe, and the numeral 12, the end portion of another length which is joined to the first length. The improved coupling comprises two rings 14 which follow the outer perimeter of the respective flexible pipe portions 10 and 12. These rings may advantageously be endless in form, and be at least partially wrapped, loosely and removably, in the respective adjacent pipe portions, as clearly indicated in Fig. 3. The wrapping of the form rings, loosely and removably without destroying the integrity of the pipe structure, is advantageously accomplished by folding back circumferentially, the end portion of each pipe into a form that may be compared to the cuff of a shirt sleeve, and which, when the removable ring is taken out, returns to substantially its original shape. The return bend 15 of each cuff extends around, and at least partially encloses the respective ring 14, the respective cuff portion being brought down and disposed circumferentially against the body of the pipe as indicated at 16, thus forming in cross-section, a curved circumferential portion 13 with circumferentially disposed, reentrant angular leg portions consisting of the inclined portion 19 and the portion 16. The portions 19 and 16 are circumferential in character, and at least partially define an outer surface that may be said to be "reentrant angular" in character.

The fact that the flexible material of the pipe is foldable into a cuff, and is again unfoldable into substantially its original shape, is of great value for many temporary uses.

Now, by placing two flexible pipes with the cuff-enclosed rings, end to end, as indicated in Fig. 3, so that the two fabric-covered rings are spaced axially apart from each other, and the fabric coverings are tangent to each other at the line 17, and by applying suitable pressure to force the rings mutually toward each other, a substantially tight joint is formed between the two lengths of pipe. The suitable pressure may be applied in various ways, but I prefer it to be conveniently exerted by means of a circumferential hollow ring or channel 18 having the back 18a and the inclined side portions 18b. The inner faces of the inclined side portions 18b form circumferential cams which bear tangentially against the similar inclined portions 19 of the flexible pipe cuffs. The lower extremities 18c of the inclined side portions 18b, are preferably curved upward so as to be capable of smoothly drawing each cuff portion 16 circumferentially against the outer surface of the respective pipe.

The channel 18 is circumferentially expansible or contractible because of having one end 18d overlapping the other end 18e, and being provided with the respective lugs 20 and 21 rigidly attached to the back 18a of the channel 18 at appropriate points thereof. The lugs 20 and 21 may be forcibly drawn toward each other by means of a threaded bolt 24 provided with a wing-nut 25. Thus, by tightening the wing-nut, the circumferential channel 18 is contracted, and in so acting, the inner inclined faces of the side portions 18d force the cuff-covered rings 14 mutually toward each other, thus squeezing together between them tangentially, the circumferential portions along the line 17, to form a substantially fluid-tight joint. At the same time, the inner faces of the side portions 18d, form tight joints against the outer faces of the inclined cuff portions 19, thereby assisting further in securing a tight closure in the coupling of the two pipes 10 and 12.

To secure the best results, the circumferential channel 18 should have its lower curved portions 18c so positioned normally, that an absolutely tight contact is formed circumferentially, between the two cuff portions 15 abutting along the line 17, before the lower curved faces of the portions 18c come into contact with the outer surfaces of the cuff portions 16, thus leaving always, a small clearance space between the said lower curved faces and the said outer cuff portions, as indicated at 26 in Fig. 3.

The rings 14 may be made of any suitable material, for example, metal, such as iron, and the cross-section of the rods of which the rings are formed, is preferably round, although other cross-sectional shapes are not excluded.

In order to facilitate manipulation of the device, the lug 21 may be forked, as indicated in Fig. 2, so that the bolt 24 may be swung out of, or into, engagement therewith. For this purpose, the hole 20a in the lug 20, in which the bolt hangs, is made sufficiently large to allow the bolt to assume another position, such as indicated by the dotted line 24a.

Describing the invention in another way, it may be said to consist of a coupling for two pipes having stiffened end portions adjacent each other, each of the two end portions comprising a circumferential abutment extending beyond the normal outside diameter of the respective end portion. The abutment is rounded in cross-section on the side away from the end face of the respective end portion, thereby providing a linear, tangential, circumferential contact zone spaced apart from the outside surface of the pipe. The circumferentially contractible channel 18 has the circumferential, inner inclined faces of its flanges 18b in tangential contact with the rounded abutment along the aforesaid circumferential contact zone. Since, theoretically, the contact zone has only a linear dimension, the friction between the channel flanges and the circumferential abutments is reduced to minimum, with the result that a maximum pressure is exerted upon the two mutually touching end faces when the channel 18 is contracted.

The invention provides virtually a portable coupling for flexible pipe, because it is not necessary to pre-fabricate the pipe with coupling members as integral parts thereof. In the prior art, it has been necessary to mold metal parts into both ends of a flexible pipe and to pre-shape the ends thereof to receive a separate clamping member. Therefore, in the prior art, it has been necessary to make up the flexible pipe in definite lengths. In many industrial uses, such as the ventilation of mines, definite lengths are not practicable, since pipes must continually be cut to suit particular conditions. Furthermore, such particular conditions are generally temporary, and as a result, many odd lengths of pipe are accumulated, which by means of the present invention, are rendered again usable.

While a specific embodiment of the invention is herein described and shown, it is to be understood that various changes can be made in the details of construction, without avoiding the terms of the following claim.

What I claim is:

A connecting means for connecting ends of fabric or like flexible conduits, comprising rings about each of which the meeting ends of the flexible conduit sections to be connected are respectively folded, the folds being of a length to completely envelop the rings and overlie the fabric conduit beyond the rings, and a single split hollow clamping member of annular form to cooperate with the rings, the side walls of the clamping member flaring outwardly toward the axis of the member and embracing both rings at such points that the clamping force extends in a substantial axial direction of the conduits, the inner portion of the side walls of the member engaging the fabric folded around the rings, and the outwardly extended portions of the member clamping the lapped-over ends of the fabric beyond the rings, and means for tightening the single clamping member in position to compel wedging cooperation with the rings to force said rings toward each other to ensure intimate sealing relation between those meeting fabric portions overlying adjacent surfaces of the rings, while at the same time clamping the return bend end portions of the fabric against the relative remote surfaces of the conduits.

HENRY J. HERSEY, Jr.